United States Patent
Yoshino et al.

(10) Patent No.: US 10,071,782 B2
(45) Date of Patent: Sep. 11, 2018

(54) ELECTRIC VEHICLE

(71) Applicant: HONDA MOTOR CO., LTD., Minato-Ku, Tokyo (JP)

(72) Inventors: Tsutomu Yoshino, Wako (JP); Manabu Hasebe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/592,708

(22) Filed: May 11, 2017

(65) Prior Publication Data
US 2017/0327176 A1 Nov. 16, 2017

(30) Foreign Application Priority Data
May 16, 2016 (JP) .................................. 2016-098188

(51) Int. Cl.
*B62M 6/00* (2010.01)
*B62K 11/00* (2006.01)
*H01M 2/10* (2006.01)

(52) U.S. Cl.
CPC ......... *B62K 11/007* (2016.11); *H01M 2/1083* (2013.01); *B60L 2200/14* (2013.01); *B60L 2210/10* (2013.01)

(58) Field of Classification Search
CPC ........... B60K 1/02; B62K 1/00; B62K 11/007
USPC .......................... 180/21, 205.1, 206.1, 207.3
See application file for complete search history.

(56) References Cited

U.S. PATENT DOCUMENTS

| | | | |
|---|---|---|---|
| 8,776,918 B2 | 7/2014 | Metoh et al. | |
| 2004/0031632 A1* | 2/2004 | Kohda | B60K 1/04 180/68.5 |
| 2007/0084662 A1* | 4/2007 | Oikawa | A63C 17/08 180/272 |
| 2013/0299263 A1* | 11/2013 | Shimizu | B62K 3/007 180/220 |
| 2014/0058600 A1* | 2/2014 | Hoffmann | B62K 1/00 701/22 |
| 2014/0353052 A1 | 12/2014 | Muto et al. | |
| 2014/0353941 A1* | 12/2014 | Muto | B62H 1/02 280/301 |
| 2015/0151624 A1* | 6/2015 | Yamada | B60K 1/04 180/68.5 |
| 2016/0031515 A1* | 2/2016 | Andreev | B60G 21/05 180/218 |

(Continued)

FOREIGN PATENT DOCUMENTS

| | | | |
|---|---|---|---|
| JP | 2000-142551 A | | 5/2000 |
| JP | 2013-237334 A | | 11/2013 |
| JP | 2014-234035 A | | 12/2014 |

*Primary Examiner* — Toan C To
(74) *Attorney, Agent, or Firm* — Carrier Blackman & Associates, P.C.; Joseph P. Carrier; William D. Blackman

(57) ABSTRACT

An electric vehicle is provided with a highly simple and convenient structure for detachably retaining a battery, and enabling the vehicle to be lifted by hand. A battery case of the electric vehicle includes an upper extension (80F, 80G) including an upper member (80G) configured to be gripped by a hand for lifting the vehicle, and defining a gripping space (112) for receiving the hand between an upper surface of the battery received in the battery case and the upper member, and a latching structure (102, 106, 120) is provided between an upper part of the battery and an opposing part of the battery case, the latching structure including an operating member (104) positioned inside the gripping space.

8 Claims, 5 Drawing Sheets

(56) References Cited

U.S. PATENT DOCUMENTS

2016/0293906 A1\* 10/2016 Ito .......................... A01D 34/64
2017/0055443 A1\* 3/2017 Fujii ...................... A01D 34/66
2017/0259692 A1\* 9/2017 Orimo ................ B60L 11/1807

\* cited by examiner

ELECTRIC VEHICLE

TECHNICAL FIELD

The present invention relates to an electric vehicle, and in particular to a small electric vehicle such as a personal mobility vehicle provided with a detachable battery.

BACKGROUND ART

In a personal mobility vehicle such as an electric vehicle with inverted pendulum control, it is known to provide a battery case having an open upper and rear end in a rear part of the vehicle body frame and a lid pivoted to an upper end of the battery case to selectively close the open upper end of the battery case. With a projection projecting from the bottom wall of the battery case engaging a corresponding recess formed in the bottom end of the battery, a latch claw formed in the lid selectively engages a latch recess formed in the upper end of the battery so that the battery can be retained in the battery case by engaging the upper and bottom ends of the battery. See JP2013-237334A, for instance.

In a known battery mounting structure for an electric bicycle, a bracket fixedly attached to the vehicle body is provided with a positioning recess and an engagement recess, and the battery is provided with a support pin that is configured to be seated in the positioning recess. The battery is further provided with an engagement projection which is configured to be engaged by the engagement recess as the battery is rotated around the support pin seated in the positioning recess. See JP2000-142551A.

In the prior art disclosed in JP2013-237334A, the battery case is required to be fitted with a pivoted lid which complicates the battery retaining structure.

In the case of the prior art disclosed in JP2000-142551A, the lower part of the battery can be supported in a highly simple manner, but a latching structure is required for securing an upper part of the battery in a stable manner against vibrations and impacts which the vehicle is expected to experience.

In the field of personal mobility, the vehicle is often provided with a handle or a grip for lifting the vehicle for transportation and other purposes, in addition to a battery case for accommodating a battery therein in a detachable manner.

SUMMARY OF THE INVENTION

A primary object of the present invention is to provide an electric vehicle which is provided with a highly simple and convenient structure for detachably retaining a battery, and enabling the vehicle to be lifted by hand.

A second object of the present invention is to provide an electric vehicle which is provided with a structure combining a grip for lifting the vehicle and a battery case for detachably retaining a battery in a highly compact manner.

To achieve such objects, the present invention provides an electric vehicle including a vehicle body frame (12), a wheel (14) supported by the vehicle body frame, an electric motor (60) for driving the wheel, and a power unit (26) for supplying electric power to the electric motor, the power unit comprising a battery case (80) provided in a rear part of the vehicle body frame and having a rearwardly facing opening, and a battery (82) configured to be detachably placed in the battery case, wherein the battery case includes an upper extension (80F, 80G) including an upper member (80G) configured to be gripped by a hand for lifting the vehicle, and defining a gripping space (112) for receiving the hand between an upper surface of the battery received in the battery case and the upper member, and a latching structure (102, 106, 120) is provided between an upper part of the battery and an opposing part of the battery case, the latching structure including an operating member (104) positioned inside the gripping space.

Owing to this arrangement, the structure for lifting the vehicle and the structure for accessing the battery can be combined into a compact unit.

The vehicle may consist of an inverted pendulum vehicle.

In a preferred embodiment of the present invention, the operating member includes an operating arm having a base end pivotally supported by the battery case and a free end extending forward, and is configured to release the latching structure by being depressed downward.

For the operating member to be operated by a user, a hand must be inserted into the gripping space with the palm of the hand facing downward. On the other hand, for lifting the vehicle by inserting a hand into the gripping space, the palm of the hand must be facing upward. Therefore, when lifting the vehicle, an inadvertent operation of the operating member can be prevented.

Preferably, the operating arm extends forward with a downward slant.

In this arrangement, the operating arm is required to be moved in a rearward direction so that the operating arm is most effectively prevented from being operated when a hand is inserted into the gripping space with the palm of the hand facing upward.

The upper extension may include a pair of side walls and an upper wall extending between the side walls, the upper member consisting of the upper wall. However, the upper member may also consist of a bar or any other member that is suitable to be held by a hand for lifting the vehicle.

In a particularly preferred embodiment of the present invention, the vehicle is configured to be placed in a forwardly slanted park position, and the battery case includes a bottom wall extending substantially horizontally when the vehicle is in operation, and a slanted wall extending from a rear edge of the bottom wall with a downward slant, the slanted wall being angled in such a manner that the slanted wall extends substantially horizontally when the vehicle is in the park position.

The slanted wall provides a surface for placing the battery in a stable manner when the vehicle is placed in the forwardly slanted park position. Although the battery is relatively heavy, the presence of the slanted wall allows the battery to be installed and removed with a minimum effort.

In a particularly preferred embodiment of the present invention, the battery is provided with a pair of lateral projections located in lower front parts of side surfaces of the battery, and each of opposing side walls of the battery case is provided with a guide slot for guiding a rotational motion of the battery around a lateral axial line and a vertical motion of the battery from and to a state where the battery is placed on the slanted wall.

According to this embodiment, owing to the cooperation between the lateral projections and the guide slots, the battery can be properly positioned on the slanted wall, and tilted forward into a fully received position in an effortless manner when installing the battery into the battery case with the vehicle positioned in the park position. When removing the battery from the battery case, the battery may be raised from the fully received position into an upright position on the slanted wall, and then lifted upward, again, owing to the cooperation between the lateral projections and the guide slots.

For the convenience of lifting and carrying the battery, the battery may be provided with a grip handle in an upper part thereof.

DESCRIPTION OF THE PREFERRED EMBODIMENT(S)

A preferred embodiment of the present invention is described in the following with reference to the appended drawings.

The illustrated electric vehicle consists of an inverted pendulum vehicle 10. The directions mentioned in the following disclosure will be based on the viewpoint of the rider or the occupant of the inverted pendulum vehicle 10.

Figure 1:
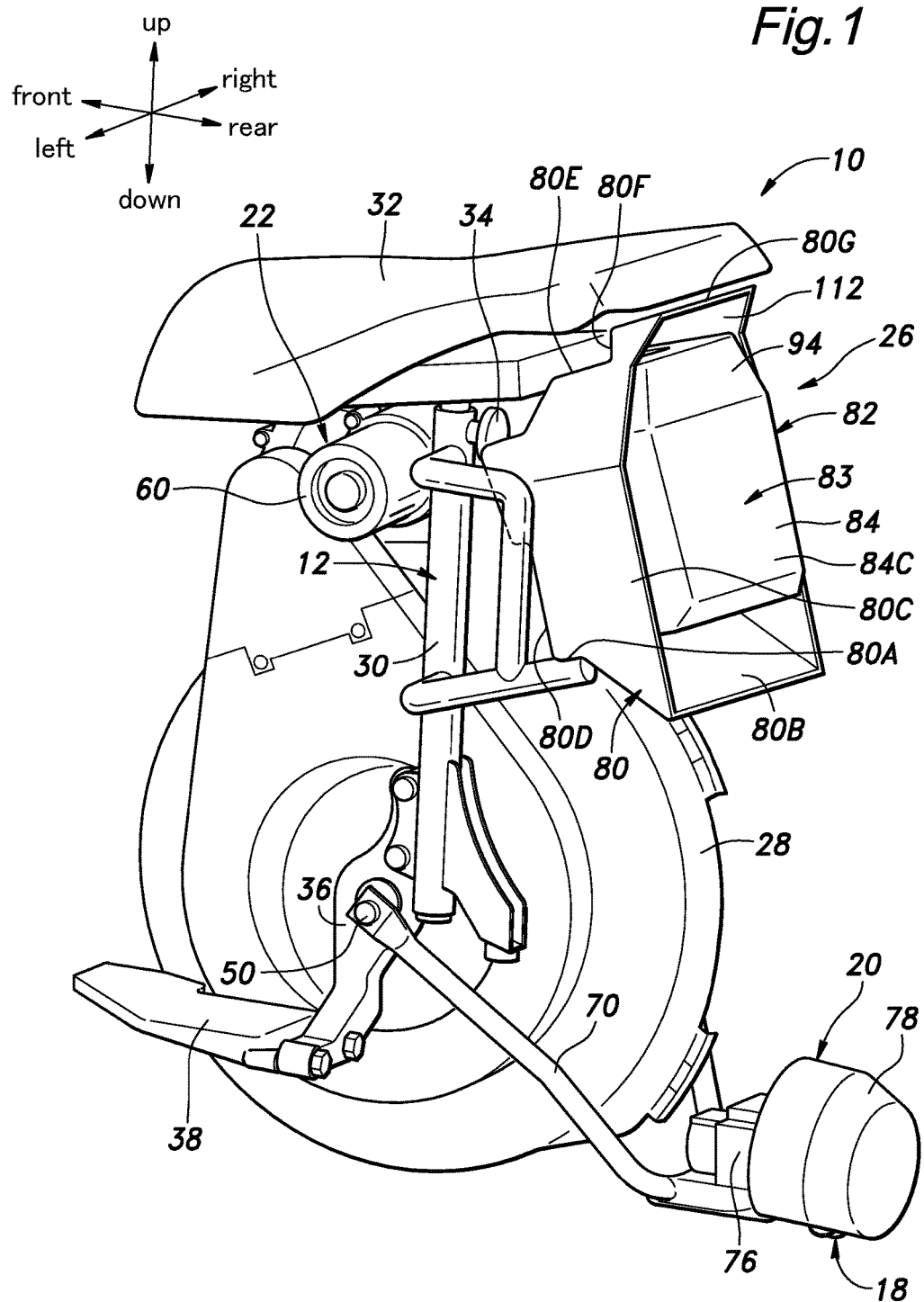
FIG. 1 is a perspective view of an inverted pendulum vehicle embodying the present invention.
Figure 2:
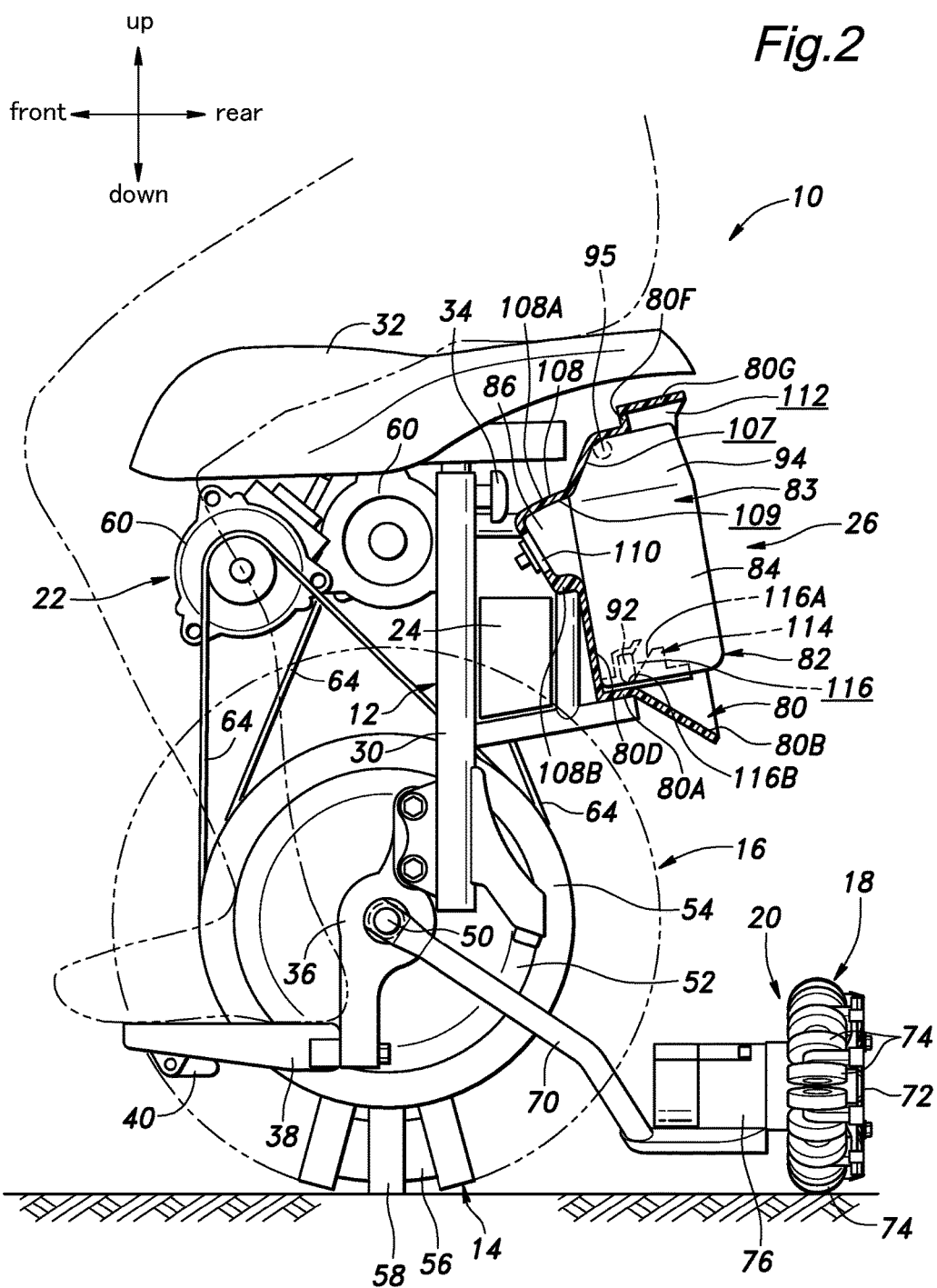
FIG. 2 is a side view of the inverted pendulum vehicle partly in section.
Figure 3:
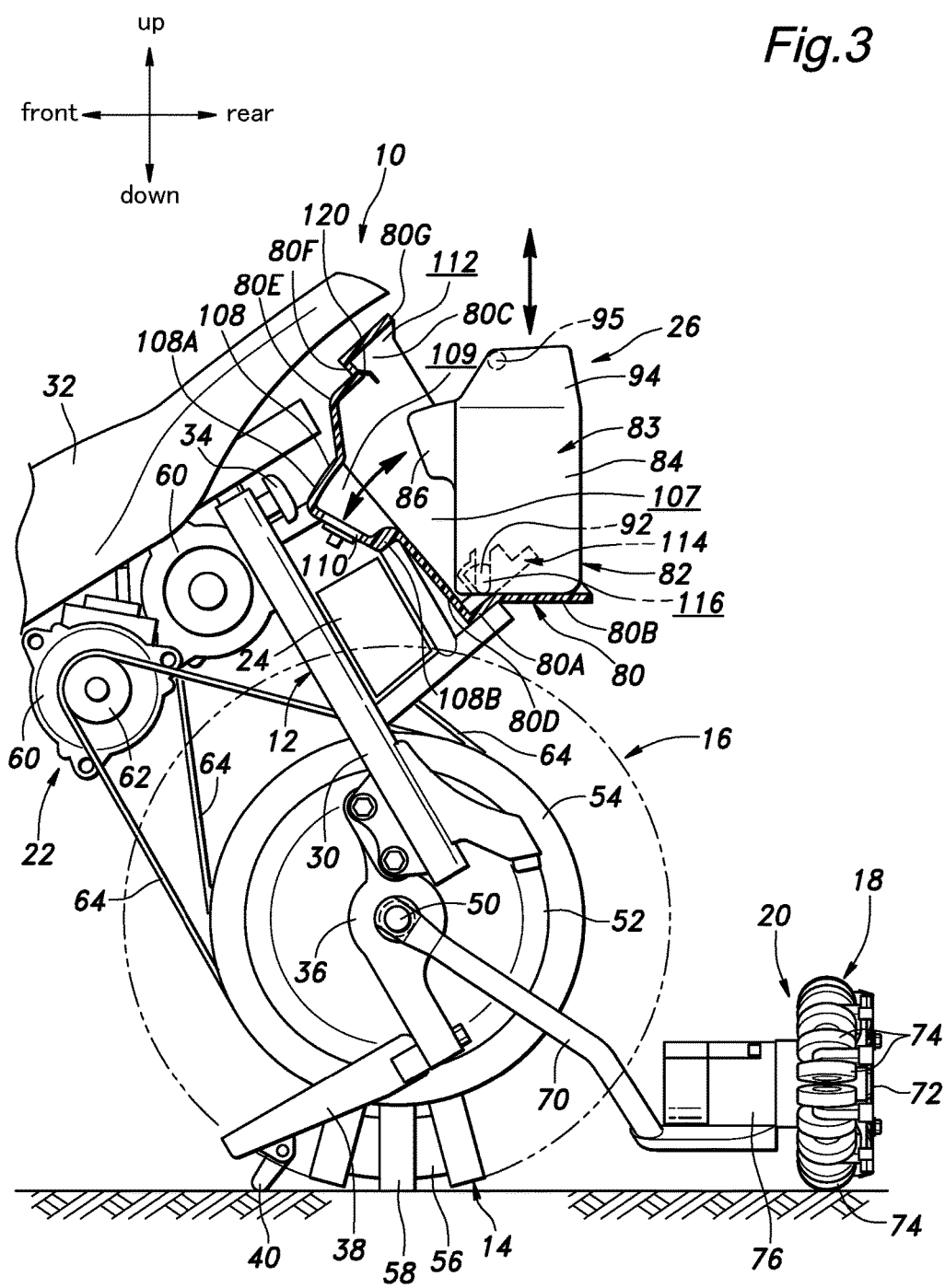
FIG. 3 is a view similar to FIG. 2 showing the inverted pendulum vehicle in a park position.

As shown in FIGS. 1 to 3, the inverted pendulum vehicle 10 includes a vehicle body frame 12, a propulsion unit 16 including a main wheel 14, a tail wheel unit 20 including a tail wheel 18, a drive unit 22 for driving the propulsion unit 16, a control unit 24 for controlling the drive unit 22 and the tail wheel unit 20, a power unit 26 for supplying electric power to the control unit 24, the drive unit 22 and the tail wheel unit 20, and an outer cover 28 covering the exterior of the propulsion unit 16.

The vehicle body frame 12 includes a pair of vertically extending side posts 30 located on either side of the vehicle body frame 12, and a cross beam (not shown in the drawings) extending laterally between the two side posts 30. The upper ends of the side posts 30 support a saddle 32 in such a manner that the height of the saddle 32 may be adjusted with the aid of an adjustment screw 34.

A foot rest 38 is attached to the lower end of each side post 30 via a mounting bracket 36. The bottom side of each foot rest 38 is fitted with a retractable stand 40 which extends downward when deployed to support the inverted pendulum vehicle 10 in a forwardly tilted position (park position) as shown in FIG. 3.

The propulsion unit 16 is positioned between the two side posts 30, and includes a support shaft 50 extending laterally between the two mounting brackets 36, a pair of drive disks 52 rotatably supported by the support shaft 50 in an individually rotatable manner, and a pair of driven pulleys 54 (for cogged belt) attached to the respective drive disks 52 in a coaxial manner.

Each drive disk 52 has a frusto-conical shape with the tapered end thereof facing inward, and a plurality of metallic drive rollers (free rollers not shown in the drawings) are rotatably supported on the tapered outer circumferential surface of the drive disk 52 at a regular angular interval. The rotational center lines of the drive rollers are in a skewed relationship to the rotational center line of the drive disks, and the drive rollers are arranged along the circumference of the two drive disks 52 in a symmetric manner with respect to the center plane extending longitudinally and vertically through the vehicle body frame 12.

The main wheel 14 includes a metallic annular member 56 and a plurality of driven rollers (free rollers) 58 rotatably supported by the annular member 56 so as to be rotatable around the tangential line of the annular member 56. Each driven roller 58 contacts the road surface as the main wheel 14 rotates around the rotational center line thereof, and is provided with an outer layer made of rubber for an improved traction. The main wheel 14 is interposed between the drive disks 52 in such a manner that the driven rollers and drive rollers engage with each other.

For the details of the mechanism for driving the main wheel 14, reference may be made to JP2014-234035A (U.S. Pat. No. 9,511,656B2).

The drive unit 22 includes a pair of electric motors 60 and a par of drive pulleys 62 for cogged belt actuated by the respective electric motors 60, and an endless cogged belt 64 is passed around each drive pulley 62 and the associated driven pulley 54 so that the two drive disks 52 can be individually driven by the respective electric motors 60.

The tail wheel 18 of the tail wheel unit 20 is attached to a rear end of a tail wheel arm having a front end (base end) pivotally connected to the support shaft 50. The tail wheel 18 consists of an omni-wheel that includes a disk wheel 72 and a plurality of free rollers 74 attached to the periphery of the disk wheel 72 so as to be rotatable around the respective rotational center lines thereof. The tail wheel 18 contacts the road surface under the gravitational force, and rotatively actuated by an electric motor 76 mounted on the tail wheel arm 70 when a yaw movement of the vehicle 10 is required. The tail wheel 18 is covered by an outer cover 78 as shown in FIG. 1.

The control unit 24 includes a main wheel PDU (not shown in the drawings), a tail wheel PDU (not shown in the drawings), a DC-DC converter (not shown in the drawings) and gyro sensors (not shown in the drawings), and performs an inverted pendulum control by taking into account the tilt angle of the vehicle body frame 12 and the movement of the gravitation center of the rider seated on the saddle 32, in addition to a travel control for the main wheel 14, and a cornering control using the tail wheel 18.

The inverted pendulum control maintains the vehicle body frame 12 in an upright posture so that the vehicle 10 is enabled to stop and travel while maintaining an upright posture as shown in FIGS. 1 and 2.

The power unit 26 includes a battery case 80 attached to a rear part of the vehicle body frame 12, and a battery (battery pack) 82 detachable installed in the battery case 80.

The battery 82 includes a substantially rectangular outer shell 84 containing battery cells (secondary battery cells) in a sealed condition, and an upper frame 94 integrally formed in an upper part of the outer shell 84. The outer shell 84 and the upper frame 94 may be made of molded plastic material. The front end of the outer shell 84 is integrally provided with a front projection 86 projecting from an otherwise planar front wall of the outer shell. The projecting end of the front projection 86 defines a planar flat surface which is slightly tilted in the forward direction, and is provided with a central recess 88 for receiving a female connector 90 for electric power.

The upper wall 86A and the lower wall 86B of the front projection 86 define arcuate surfaces (part-cylindrical surfaces) centered around a lower front part of the outer shell 84 as will be discussed hereinafter.

A lateral projection 92 is integrally formed in a front and lower part of each side wall 84B of the outer shell 83. The lateral projection 92 is vertically elongated, and the bottom end of the lateral projection 92 is formed as a semi-cylindrical bottom surface 92A having a center extending in the lateral direction.

The upper frame 94 include a pair of side walls 94A continuously connected to the respective side walls 84B of the outer shell 83, and a rear wall 94B continuously connected to the rear wall 84C (see FIG. 1) of the outer shell 83 so that an upper recess 96 having an open upper and front end is defined on top of the outer shell 83.

An upper front part of the upper frame 94 is integrally provided with a handle bar 95 extending laterally in an upper part of the upper recess 96 between the two side walls 94A. The handle bar 95 is configured to be held by a hand for transporting the battery 82.

Figure 4:
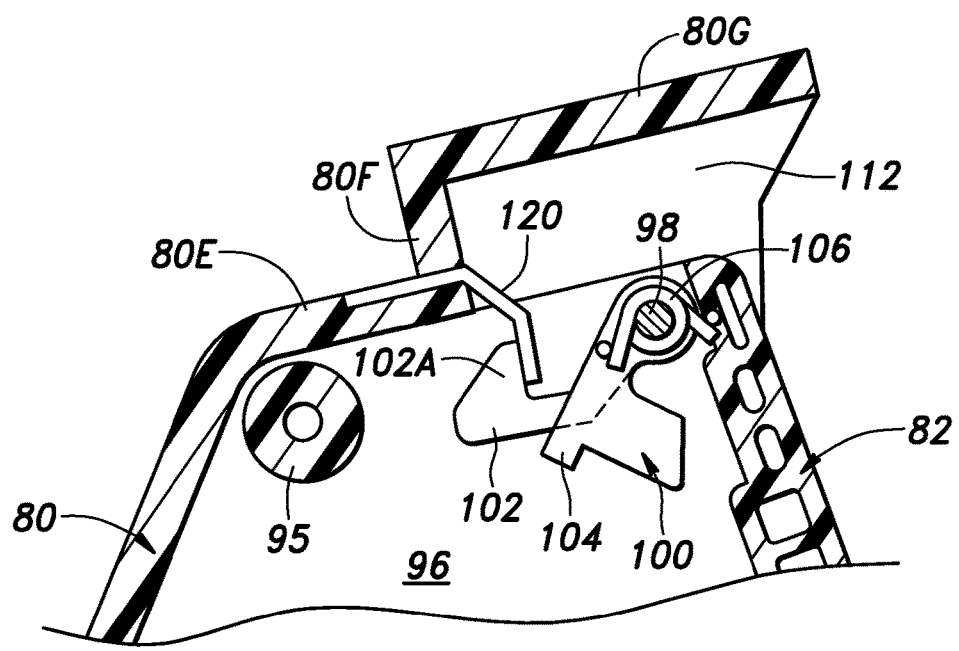
FIG. 4 is a fragmentary sectional view of an upper part of a battery case of the inverted pendulum vehicle.
Figure 5:
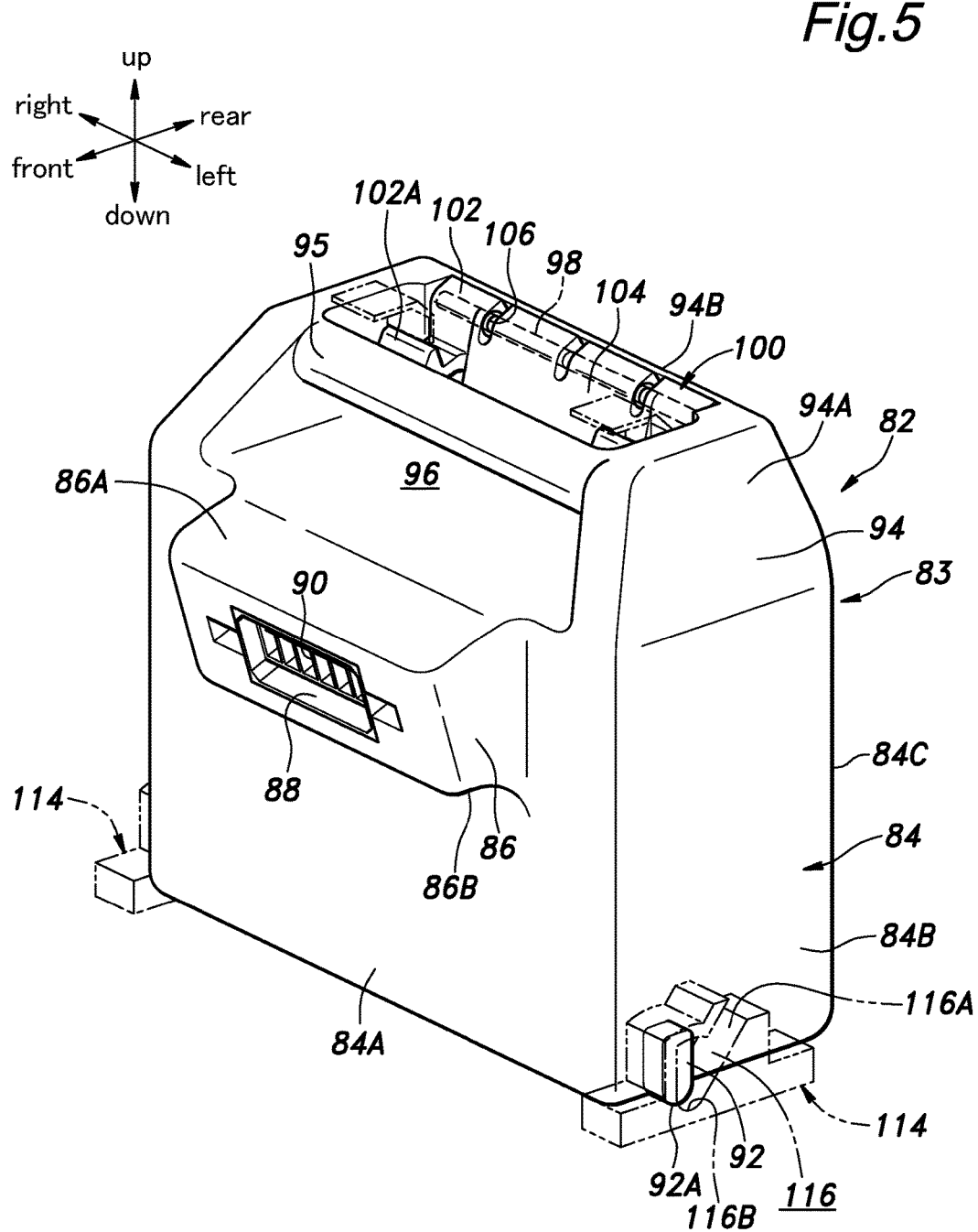
FIG. 5 is a perspective view of a battery for the inverted pendulum vehicle.

As shown in FIG. 4, a support shaft 98 extends laterally in an upper rear part of the upper recess 96 between the two side walls 94A. A battery side latch member 100 made of plastic material is pivotally supported by the support shaft 98. The battery side latch member 100 includes a pair of engagement claws 102A located on either side of the battery side latch member 100 and directed upward, and an operating arm 104 having the shape of a rectangular plate extending between the two claws 102A. A torsion coil spring 106 is wound around the support shaft 98 and is engaged by the rear wall 94B of the upper frame 94 at one end and by the battery side latch member 100 at the other end so that the battery side latch member 100 is biased in an upward direction (clockwise direction in FIG. 4). The battery case 80 is provided with a case side latch member 120 which is fixedly attached to the battery case 80, and is configured to engage the engagement claws 102A of the battery side latch member 100 when the battery 82 is received in the battery case 80. When the engagement claws 102 are pivoted in the downward direction (counterclockwise direction in FIG. 4) by manually depressing the operating arm 104 against the spring force of the torsion coil spring 106, the engagement claws 102A of the battery side latch member 100 are released from the case side latch member 120 so that the battery 82 can be removed from the battery case 80 as will be described hereinafter.

As shown in FIG. 4, the operating arm 104 is slanted such that the free end (front end) of the operating arm 104 is lower than the base end thereof. Therefore, when operating the operating arm 104, the free end of the operating arm 104 is required to be moved in a downward and rearward direction.

The battery case 80 is made of molded plastic member, and is provided with a bottom wall 80A which extends substantially horizontally when the vehicle 10 is in the upright posture, a slanted wall 80B which extends rearward from the rear edge of the bottom wall 80A. The slanted wall 80B is configured such that the slanted wall 80B extends substantially horizontally when the vehicle 10 is in the prescribed forwardly tilted position (park position). The battery case 80 further includes a pair of side walls 80C extending upright from the respective side edges of the bottom wall 80A and the slanted wall 80B, a front wall 80D connecting the front edges of the side walls 80C and the bottom wall 80A to one other, and an upper wall 80E connecting the upper edges of the side walls 80C and the front wall 80D. Thus, the battery case 80 is formed as a generally rectangular box having an open rear end and internally defines a battery chamber 107.

When the battery 82 is received in the battery chamber 107, the side walls 80C of the battery case 80 opposes the respective side walls 84B and 94A of the outer shell 83 of the battery 82 with a small gap, and the front wall 84A of the outer shell 83 of the battery abuts the front wall 80D of the battery case 80.

The front wall 80D of the battery case 80 is provided with a front recess 109 which is recessed forward so as to be complementary to the front projection 86 of the battery 82. More specifically, the front recess 109 is defined by an arcuate upper wall 108A and an arcuate lower wall 108B corresponding to the upper wall 86A and the lower wall 86B of the front projection 86. A male connector 110 for conducting electricity from and into the battery 82 in cooperation with the female connector 90 of the front projection 86 is provided in a front wall 108C of the front recess 109.

The battery case 80 is further provided with an upper wall extension 80G which is connected to the rear edge of the upper wall 80E via an upright wall 80F. The side edges of the upper wall extension 80G and the upright wall 80F are continuously connected to the upper edges of the respective side walls 80C of the battery case 80. Therefore, a space having an open rear end is defined between the upper end of the battery 82 (the upper frame 94 of the outer shell 83) and the upper wall extension 80G. This space is referred to as a gripping space 112 in the following disclosure.

The gripping space 112 can be used for lifting the vehicle 10. A hand of a user may be inserted into the rear opening of the gripping space 112 with the palm of the hand facing upward to grip (or hook) the upper wall 80E to lift the vehicle 10, for instance, for transporting the vehicle 10 from one place to another.

The case side latch member 120 is made of a metallic hook member insert molded in the rear end part of the upper wall 80E of the battery case 80.

A lower front part of each side wall 80C of the battery case 80 is integrally provided with a battery support portion 114 which defines a guide slot 116 extending in an upward and rearward direction and having an open rear end. In particular, the lower surface of the guide slot 116 defines a linear plane with a downward slant toward the front part thereof. The slant angle of the guide slot 116 is determined such that the guide slot 116 extends vertically when the vehicle is in the forwardly tilted park position. The rear end of the guide slot 116 has a dimension that is slightly greater than the width (fore and aft dimension) of the corresponding lateral projection 92 of the battery outer shell 84, but significantly smaller dimension than the length (vertical dimension) of the corresponding lateral projection 92 of the battery outer shell 84. The lower front end of the guide slot 116 is enlarged, and has a slightly greater vertical dimension than the length (vertical dimension) of the corresponding lateral projection 92 of the battery outer shell 84.

Typically, when installing the battery 82 into the battery case 80, the inverted pendulum control of the vehicle 10 is terminated, and the vehicle 10 is put into the forwardly tilted position (park position) with the stands 40 deployed and engaged by the ground surface.

Therefore, when the battery 82 is about to be fitted into the battery chamber 107 with each lateral projection 92 engaged by the corresponding guide slot 116, the battery 82 is guided vertically downward onto the slanted wall 80B. In the forwardly tilted position (park position) of the vehicle 10, the slanted wall 80B is placed in a horizontal position, and the battery may be placed on the slanted wall 80B in a stable manner. Once each lateral projection 92 reaches the bottom (front) end of the corresponding guide slot 116, the battery 82 is allowed to be tilted in the forward direction or into an upright posture (with respect to the vehicle body frame 12) so that the battery 82 is fully received in the battery chamber 107.

More specifically, the bottom surface 92A of each lateral projection 92 abuts the bottom surface 116B of the corresponding guide slot 116. By pushing an upper part of the battery 82, the battery 82 may be tilted forward around the point of contact between the bottom surfaces 92A of the lateral projections 92 and the bottom surfaces 116B of the corresponding guide slots 116. Thereby, the battery 82 is fully received in the battery chamber 107. At the same time, the male connector 110 on the side of the battery case 80 is fully fitted into the female connector 90 on the side of the battery 82.

Also, the engagement claw 102A is engaged by the case side latch member 120. At this time, the lateral projections 92 are received in the lower ends of the guide slots 116 so that the battery 82 is positively retained in the battery chamber 107 at both the upper end and the lower end thereof.

When removing the battery 82 from the battery case 80, the inverted pendulum control of the vehicle 10 is terminated, and the vehicle 10 is put into the forwardly tilted position (park position) with the stands 40 deployed and engaged by the ground surface.

The user (rider) then inserts a hand into the rear opening of the gripping space 112 with the palm of the hand facing downward. By pressing the operating arm 104 downward and/or rearward, the engagement claw 102A is disengaged from the case side latch member 120. By pulling the upper part of the battery 82 rearward, the battery 82 is caused to tilt rearward around the point of contact between the bottom surfaces 92A of the lateral projections 92 and the bottom surfaces 116B of the corresponding guide slots 116. Thus, the battery 82 is placed upright on the slanted wall 80B in spite of the forwardly tilted state of the vehicle 10.

At this time, the guide slot 116 extends vertically so that the battery 82 may be pulled upward. Therefore, the user is enabled to grip the handle bar 95, and pull up the battery 82 with a minimum effort.

According to the illustrated embodiment, the battery 82 can be temporarily placed on the slanted wall when installing the battery 82 and removing the battery 82. Therefore, even though the battery 82 is relatively heavy, the user can install and remove the battery with a minimum effort. Also, the operating arm 104 is normally concealed inside the gripping space 112 so that an inadvertent operation of the operating arm 104 can be avoided.

When lifting the vehicle 10 by a hand, the hand is inserted in the gripping space 112 from the rear direction with the palm of the hand facing upward. Therefore, an inadvertent operation of the operating arm 104 can be avoided.

Thus, according to the illustrated embodiment, the arrangement for enabling the vehicle 10 to be lifted, and the arrangement for accessing the battery 82 are combined in a limited space so that the external appearance of the vehicle is enhanced, and the number of necessary components can be minimized. Also, even though the gripping space 112 serves the dual purposes of lifting the vehicle 10 and accessing the battery 82, an inadvertent releasing of the engagement claw 102A can be avoided.

Although the present invention has been described in terms of preferred embodiments thereof, it is obvious to a person skilled in the art that various alterations and modifications are possible without departing from the spirit of the present invention. For instance, the present invention may also be applied to electric bicycles and other small vehicles.

The invention claimed is:

1. An electric vehicle including a vehicle body frame, a wheel supported by the vehicle body frame, an electric motor for driving the wheel, and a power unit for supplying electric power to the electric motor, the power unit comprising a battery case provided in a rear part of the vehicle body frame and having a rearwardly facing opening, and a battery configured to be detachably placed in the battery case, wherein the battery case includes an upper extension including an upper member configured to be gripped by a hand for lifting the vehicle, and defining a gripping space for receiving the hand between an upper surface of the battery received in the battery case and the upper member, and a latching structure is provided between an upper part of the battery and an opposing part of the battery case, the latching structure including an operating member positioned inside the gripping space.

2. The electric vehicle according to claim 1, wherein the vehicle consists of an inverted pendulum vehicle.

3. The electric vehicle according to claim 1, wherein the operating member includes an operating arm having a base end pivotally supported by the battery case and a free end extending forward, and is configured to release the latching structure by being depressed downward.

4. The electric vehicle according to claim 3, wherein the operating arm extends forward with a downward slant.

5. The electric vehicle according to claim 1, wherein the upper extension includes a pair of side walls and an upper wall extending between the side walls, the upper member consisting of the upper wall.

6. The electric vehicle according to claim 1, wherein the vehicle is configured to be placed in a forwardly slanted park position, and the battery case includes a bottom wall extending substantially horizontally when the vehicle is in operation, and a slanted wall extending from a rear edge of the bottom wall with a downward slant, the slanted wall being angled in such a manner that the slanted wall extends substantially horizontally when the vehicle is in the park position.

7. The electric vehicle according to claim 6, wherein the battery is provided with a pair of lateral projections located in lower front parts of side surfaces of the battery, and each of opposing side walls of the battery case is provided with a guide slot for guiding a rotational motion of the battery around a lateral axial line and an upward motion of the battery from a state where the battery is placed on the slanted wall.

8. The electric vehicle according to claim 7, wherein the battery is provided with a grip handle in an upper part thereof.

* * * * *